(No Model.)
A. B. GRIFFEN.
PROCESS OF CARBURETING GAS.
No. 584,349. Patented June 15, 1897.
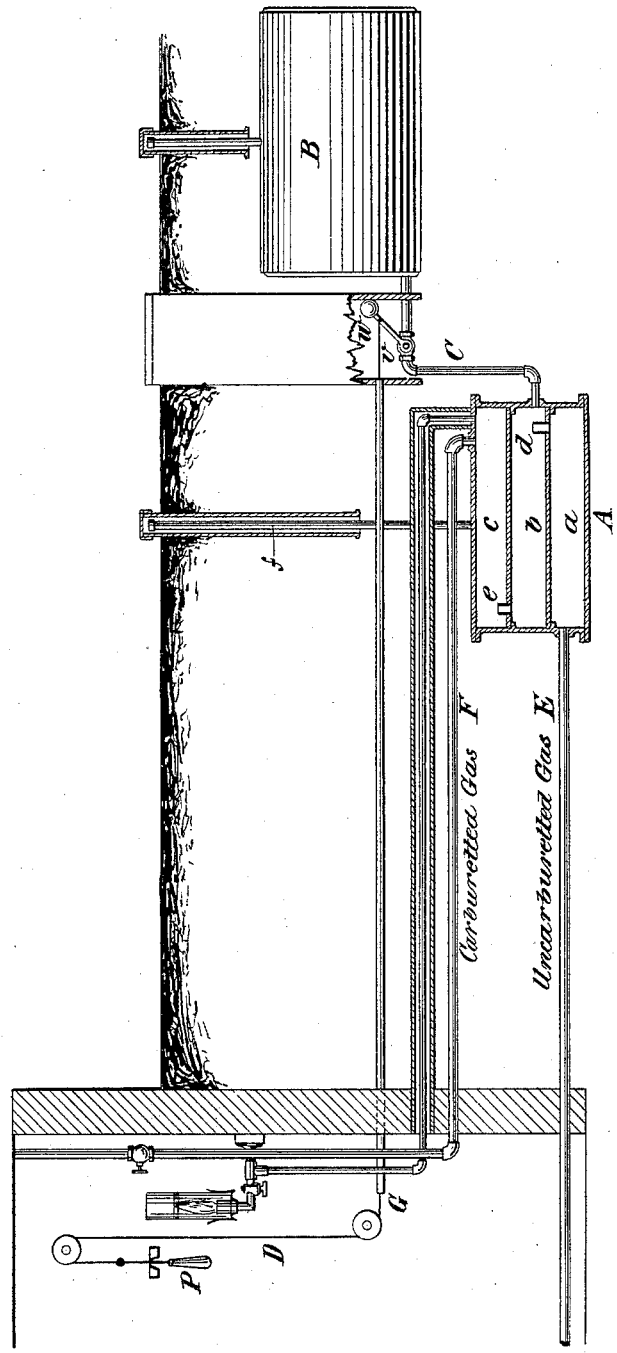
Witnesses:
Raphaël Netter
Sands F. Randall
Inventor
Arthur B. Griffen
by Clarkson A. Collins
Attorney

UNITED STATES PATENT OFFICE.

ARTHUR B. GRIFFEN, OF VERONA, NEW JERSEY, ASSIGNOR TO THE GILBERT & BARKER MANUFACTURING COMPANY, OF SPRINGFIELD, MASSACHUSETTS.

PROCESS OF CARBURETING GAS.

SPECIFICATION forming part of Letters Patent No. 584,349, dated June 15, 1897.

Application filed January 22, 1895. Serial No. 535,770. (No specimens.)

*To all whom it may concern:*

Be it known that I, ARTHUR B. GRIFFEN, a citizen of the United States, residing at Verona, in the county of Essex and State of New Jersey, have invented a new and Improved Process of Carbureting Gas, of which the following is a specification.

My invention is especially valuable in connection with the carbureting of those gases known as "fuel" or "water" gases, of which hydrogen gas is an important constituent and which burn with a non-luminous or only slightly-luminous flame, but is also applicable to any aeriform fluid, such as atmospheric air or ordinary coal-gas. "Water-gas," so called, is now made in large quantities for use as a fuel by the decomposition of steam in a furnace. Such gas, however, burns with a non-luminous or only slightly-luminous flame and is not, therefore, by itself available for purposes of illumination. It makes, however, a desirable base for an illuminating-gas, which may be made by charging it with carbon in a state suitable for combustion, whereby a gas having desirable illuminating properties is produced. This has been generally accomplished heretofore by subjecting a liquid hydrocarbon to destructive distillation in a retort, whereby the hydrocarbon is cracked and converted into a carbonaceous gas, which is then mixed with the water-gas, so as to enrich it. Such a process, while resulting in the production of an illuminating-gas of good quality, has certain disadvantages, requiring, as it does, the construction of a large central plant for the enrichment of the gas and the employment of skilled labor and involving considerable expense in the use of fuel and in the destruction of retorts, owing to the high temperature required. As is well known, gaseous bodies, such as atmospheric air, may be carbureted or charged with hydrocarbon vapor, so as to produce an illuminating-gas, by passing them over or through a volatile hydrocarbon liquid, such as commercial gasolene, a method commonly practiced in making the so-called "gasolene-gas" by carbureting atmospheric air. A serious difficulty encountered in the use of gas made in this way has been the great variation in the amount of hydrocarbon vapor taken up by a given volume of air under varying conditions. The main conditions affecting this are the extent of surface of the liquid exposed to the air in the carbureter, the temperature of the liquid and the air, and the volatility or density of the hydrocarbon liquid. Variations in this latter condition have been found the most troublesome to deal with and have thus far proven an insuperable obstacle to the application of this method of carbureting to fuel or water gas. This is due to the fact that gasolene and the other lighter products of petroleum are not homogeneous in the sense that all the parts or molecules of a given volume of the liquid are of the same specific gravity or volatility; but the liquid is made up of a great number of grades differing from each other in specific gravity and volatility, which are intimately mixed together mechanically, and while the specific gravity of the liquid, as indicated by measuring instruments, is the same in all parts this is merely the average specific gravity of the different grades composing it. When a liquid of this compositive character is placed in a carbureter or gas-generator and water-gas or other gas is passed over it, the more volatile portions evaporate much more rapidly than the less volatile portions, and it follows from this that its volatility becomes less and less until the residuum becomes quite dense and evaporates quite slowly. Each cubic foot of gas passed through the carbureter under these conditions will vaporize more of the gasolene, the temperature remaining constant, than any succeeding cubic foot. When the carbureter is first filled and the specific gravity of the gasolene is at its lowest point, a given volume of gas will carry to the burners several times as much vapor as it will when the gasolene is nearly used up, and its specific gravity is at its highest point. This results in a great variation in the quality of the gas produced, and if such a variable gas is burned through a fixed burner the character of the flame necessarily undergoes a corresponding variation.

The object of my improvement is to obviate these difficulties and to provide for the carbureting of a non-carbonaceous or insufficiently carbonaceous gas at ordinary temperatures with the vapor of a volatile hydrocarbon liquid, such as commercial gasolene, in such a manner that the gas shall be carbureted to a substantially uniform extent and give a light of substantially uniform candle-power.

My invention is based upon the observed facts that if gas heavily charged with vapor from a volatile hydrocarbon liquid, such as gasolene, be passed over or brought in contact with a heavy not easily volatilizable hydrocarbon liquid a portion of the vapor carried by the gas will be absorbed by such heavy hydrocarbon liquid, and will continue so to be until the liquid becomes, to a certain extent, charged with the vapor; also, that if a gas uncharged with hydrocarbon vapor or not sufficiently charged therewith to produce a proper illuminating-flame be afterward passed over the liquid or mixture of liquids thus formed the hydrocarbon vapor absorbed by the liquid will be given up to the gas in such quantities as to produce a proper illuminating-gas, and will continue so to be given up until the liquid has parted with a considerable proportion of the volatile element absorbed by it.

For the purposes of my invention I locate in a suitable position, preferably at or near the point at which the illuminating-gas is to be consumed, as outside of a building to be lighted, a closed vessel known as a "gas-generator" or "carbureter," comprising two or more compartments. One or more of these is charged with a heavy hydrocarbon liquid, such as naphtha, benzin, or kerosene, which will not readily vaporize under the ordinary conditions of use, but will remain as a substantially permanent charge in the carbureter. In the other compartment or compartments of the carbureter is placed a quantity of a readily-volatile hydrocarbon liquid, such as commercial gasolene. The gas to be carbureted is caused to pass first through the compartment or compartments containing the more volatile liquid, which is rapidly volatilized, thereby heavily charging the gas with hydrocarbon vapor. The gas thus charged is then caused to pass through the compartment or compartments containing the heavy less volatile liquid. A portion of the hydrocarbon vapor carried by the gas will be absorbed by the heavy hydrocarbon liquid, so much, in fact, if the vapor is brought in contact with a sufficient surface of liquid, that at first not enough hydrocarbon vapor will remain in the gas to give a proper illuminating-flame. As the liquid, however, becomes more and more saturated with the hydrocarbon absorbed from the gas passing over it the proportion of vapor absorbed by it from the gas will grow less and less, until finally a proper quantity of hydrocarbon vapor will be carried by the gas to the burners for illuminating purposes, and the liquid will finally cease to absorb vapor from the gas altogether. Meanwhile the gasolene or other volatile hydrocarbon liquid is being deprived of its more volatile parts, and finally becomes so depleted that it will give up to the hydrogen or other gas passing over it only enough vapor to produce a proper illuminant. If the quantities of the liquids in the several compartments of the carbureter have been proportioned with exactness, this will take place at or about the same time that the heavier hydrocarbon liquid ceases to absorb vapor, and at this time the carbureting capacity of the liquids in the several compartments of the carbureter will be substantially the same. When the originally volatile hydrocarbon liquid is no longer able to give off enough vapor to properly carburet the gas passing over it, the vapor absorbed by the heavier liquid will be in turn given off, thus maintaining the quality of the gas until the absorbed vapor is substantially used up. A fresh supply of the volatile hydrocarbon liquid is then admitted to the compartment or compartments of the carbureter in which it was originally contained and the operation is repeated.

The heavy hydrocarbon liquid may be said, by reason of its property of absorbing the volatilized hydrocarbon, to act as an overflow-tank, in which an excess of hydrocarbon vapor in the gas is deposited, and from which such excess is in turn given out when required to maintain the quality of the gas.

I do not limit myself in the practice of my invention to any particular form of apparatus, but have shown in connection herewith a convenient form, which is illustrated in the drawing.

The drawing shows a section of a gas-generator or carbureter A, comprising three separate pans or compartments $a$ $b$ $c$, located one above another within an inclosing shell. The carbureter is located near the point at which the carbureted gas is to be consumed, being preferably buried in the ground or placed in a suitably-constructed vault outside of the building lighted.

B is a storage or feed tank for containing the gasolene or other volatile hydrocarbon liquid to be used. From the feed-tank B a pipe C leads to the carbureter, entering the pan $b$ thereof, or, if desired, it may be connected with both the lower pans $b$ and $a$. In the pipe C is a valve $v$, controlled by a counterweight $w$, to which is connected a wire or cord D, leading into the building, where it is connected with a bell-pull P.

E is a pipe connected with a gas-main for the admission of gas to be carbureted into the lowermost compartment of the carbureter.

F is a pipe leading from the upper chamber of the carbureter for the passage of the carbureted gas to the burners.

In starting the apparatus a part of the compartments of the carbureter, as the upper pan $c$, is charged with benzin or other heavy product of petroleum in any suitable way, as through a pipe $f$, and gasolene or other volatile hydrocarbon liquid is admitted into the lower pans or compartments $a$ $b$, the liquid, in case it is admitted directly only into the pan *b*, overflowing into the pan *a* through the pipe *d* when it has attained the requisite depth in the pan *b*. The gas to be carbureted is admitted to the lowest pan *a* and passes first over the volatile liquid in the pans *a b* and then over the heavy liquid in the pan *c*, and thence to the burners. The gas in passing over the volatile hydrocarbon liquid will at first be charged to excess with hydrocarbon vapor, a large percentage of which will, however, be absorbed by the heavier liquid as the gas passes over it, and upon lighting the gas at the burners the flame will at first indicate that the gas is insufficiently carbureted. An additional supply of gasolene is then gradually admitted by opening the valve *v* at intervals until it appears by observation of the gas-flame that the gas is being sufficiently carbureted, when the supply of gasolene is cut off. The apparatus will then run without a sensible deterioration in the quality of the gas for a considerable period, determined by the amount of gas used and the quantity of volatile liquid in the carbureter. When the gas-flame indicates by its appearance that the gas is no longer receiving a sufficient supply of hydrocarbon vapor in the carbureter, the valve *v* is again opened and a fresh supply of gasolene admitted, and the operation is repeated as often as required.

The heavy hydrocarbon in the upper part of the carbureter acts as a regulator, absorbing hydrocarbon vapor from the gas passing over it in the first instance when the gas is too heavily charged with vapor, then ceasing to absorb vapor, and afterward giving up the absorbed vapor to the gas and gradually returning to its normal condition when the more volatile liquid in the lower part of the carbureter has become so depleted that it is no longer able to sufficiently carburet the gas. A small portion of the heavy liquid may be added to the pan containing it from time to time to compensate for the slight wearing away that will take place.

If desired, a small proportion of volatile hydrocarbon liquid may at the outset be mixed with the heavy regulating liquid, so as to partly charge it and reduce both the time that will elapse before the gas reaches a proper condition and the quantity of gasolene required to be charged in the first instance in the lower pans.

It is evidently not essential whether in starting the apparatus the heavy liquid is first put in the top pan and the gasolene then admitted to the other compartments of the carbureter, or whether a quantity of gasolene is first placed in the lower pans and then enough of the benzin or other heavy liquid admitted to the top pan to change the smoky flame, which in that case will first appear, to the clear brilliant flame desired, or whether both are introduced into their respective compartments at the same time, it being only essential in this respect that the gas to be carbureted shall pass first over the gasolene or more volatile liquid and then over the benzin or heavier liquid and that the relative quantities of these shall be so adjusted that when the gasolene shall have become so depleted that it no longer gives to the gas an excess of vapor the benzin shall cease to absorb vapor from the gas. It is obvious that my process may be equally well applied to the carbureting of other gases than hydrogen or water gas—as, for example, the carbureting of ordinary coal gas, so as to increase its illuminating properties, or the carbureting of atmospheric air, so as to produce an illuminating-gas. In this latter case the pressure requisite to force the gas to the burners is supplied by means of an air-pump or other air-forcing apparatus in the manner well known in "air-gas" or "gasolene-gas" machines, and the pipe leading into the carbureter is connected with such air-pump instead of with a gas-main, as is the case when manufactured gas is used.

If desired, I may, instead of carbureting the gas at or near the several points of consumption, carburet the whole body of gas at the point of production by passing it through a carbureter or carbureters of suitable size in the manner described. I prefer, however, the former arrangement, since it enables a portion of the gas to be used uncarbureted for heating purposes and another portion to be carbureted for illuminating purposes.

I do not limit my invention to the use of the particular form of apparatus herein described or any particular form of apparatus, it being only necessary in this respect that the apparatus shall be so arranged that the heavy and the volatile hydrocarbon liquids shall be contained in separate receptacles and that the gas to be carbureted shall come in contact first with the more volatile and afterward with the less volatile liquid.

While I prefer to use naphtha or benzene as the heavy absorbent liquid, any of the heavier distillates of petroleum which are not readily vaporizable at ordinary temperatures or petroleum itself may be used.

I am aware that it has heretofore been attempted to carburet coal-gas by first passing atmospheric air through a body of gasolene at a high temperature, so as to carburet air, and then passing it through a body of water or other liquid at a low temperature to cool it and wash out or remove superfluous vapor, and finally mixing the carbureted air with the coal-gas, and that air has been carbureted by passing it first over a comparatively heavy or dense and then over a volatile hydrocarbon liquid and also by passing it over a mixture of heavy and volatile hydrocarbon liquids, and I do not claim such methods as of my invention.

What I do claim as new, and desire to secure by Letters Patent, is—

1. The hereinbefore-described process of carbureting gas which consists in charging a part of a carbureter with a volatile hydrocarbon liquid, charging another part of such carbureter with a hydrocarbon liquid substantially non-vaporizable under the ordinary conditions of use, causing the gas to pass first over such volatile liquid, and afterward over the less volatile liquid, and admitting fresh supplies of such volatile liquid to that part of the carbureter charged therewith, at such times and in such quantities as may be required to maintain the quality of the gas, substantially as described.

2. The method of carbureting gas, which consists in charging a part of a carbureter with a volatile hydrocarbon liquid, charging another part of such carbureter with a hydrocarbon liquid substantially unvaporizable under the ordinary conditions of use, admitting the gas to such carbureter and causing it to pass first over the volatile hydrocarbon liquid, and afterward over that which is less readily vaporizable, substantially as described.

3. The method of producing illuminating-gas of substantially uniform quality which consists in causing a gaseous base to pass first over a volatile hydrocarbon liquid, thereby charging it to excess with hydrocarbon vapor, and then over a hydrocarbon liquid which is substantially unvaporizable under the ordinary conditions of use, thereby removing from the gas the excess of vapor carried thereby, substantially as described.

4. The method of producing illuminating-gas of substantially uniform quality which consists in passing a gaseous base, first over a volatile hydrocarbon liquid, thereby charging it with an excess of hydrocarbon vapor, and then over a hydrocarbon liquid substantially unvaporizable under the ordinary conditions, of use, by which the excess of vapor in the gas is absorbed, and afterward maintaining the quality of the gas with the absorbed vapor, substantially as described.

In testimony whereof I have hereunto subscribed my name this 17th day of January, A. D. 1895.

ARTHUR B. GRIFFEN.

Witnesses:
SANDS F. RANDALL,
CLARKSON A. COLLINS.